United States Patent
Sun

[11] Patent Number: 6,034,461
[45] Date of Patent: Mar. 7, 2000

[54] STATOR OF MOTOR

[75] Inventor: Chien-chung Sun, Hsin-Chu, Taiwan

[73] Assignee: Shu-Chen Huang, Taipei, Taiwan

[21] Appl. No.: 09/205,837

[22] Filed: Dec. 3, 1998

[51] Int. Cl.[7] .................................................... H02K 1/18
[52] U.S. Cl. ........................ 310/218; 310/216; 310/217; 310/179; 310/187; 310/259; 310/269
[58] Field of Search .................................... 310/218, 217, 310/216, 259, 269, 179, 187, 214

[56] References Cited

U.S. PATENT DOCUMENTS

| | | | |
|---|---|---|---|
| 2,298,388 | 10/1942 | Knobel | 310/217 |
| 2,556,013 | 6/1951 | Thomas | 310/217 |
| 3,495,106 | 2/1970 | Lenders | 310/42 |
| 3,626,219 | 12/1971 | Lease | 310/218 |
| 4,071,793 | 1/1978 | Cox | 310/71 |
| 4,698,539 | 10/1987 | Workman | 310/216 |
| 4,765,054 | 8/1988 | Sauerwein et al. | 29/596 |
| 5,729,072 | 3/1998 | Hirano et al. | 310/258 |
| 5,786,651 | 7/1998 | Suzuki | 310/259 |

*Primary Examiner*—Thomas M. Dougherty
*Assistant Examiner*—Thanh Lam
*Attorney, Agent, or Firm*—W. Wayne Liauh

[57] ABSTRACT

A stator of motor into which two separate magnetic poles wound by conductive wires are assembled is applied. The stator has a minimized space between the magnetic poles, so that the magnetic leakage is reduced. The work efficiency of the motor is enhanced with lowered power consumption. The material consumption of coil is also reduced, and the assembly procedure is simplified to reduce the manufacturing cost.

11 Claims, 8 Drawing Sheets

STATOR OF MOTOR

BACKGROUND OF THE INVENTION

1. Field of the Invention

The invention relates to a stator of a motor applied to an alternating current motor (AC-motor), so as to advantage assembly, to reduce coil material, and to enhance the efficiency of motor.

2. Description of the Related Art

It has been over one hundred years since the prototype of motor has been developed. The motor converts electrical energy into mechanical energy. The mechanism of a motor is to induce electromagnetic force at magnetic poles of the rotor in a motor by the current flowing through the coil of an armature. By the repulsive force between a stator and the magnetic pole, a torque is induced to cause a rotation. This theory has been applied to develop various kinds of motors ever since. The types of stators are uncountable, such as those made of a natural magnet to magnetic poles made of silicon steel laminations. FIG. 1 shows a stator 10 of an ac motor (a shaded-pole motor). The stator 10 is made of silicon steel laminations 101. FIG. 2 and FIG. 3 are a top view of a conventional stator of a motor, while FIG. 3 is a cross sectional view taken along a cutting line I—I of FIG. 2. As shown in the figures, the stator 10 includes an exterior annulus 11 and an interior annulus 12 concentric thereto. Along a first imaginary central line of both the exterior and the interior annuli 11 and 12, there is a neck portion 121 connecting the exterior annulus 11 and the interior annulus 12 between exterior annulus 11 and the interior annulus 11. A second imaginary central line perpendicular to the first imaginary central line intersects the interior annulus 12 at two intersections. The interor annulus 12 has one opening 122 at each intersection. Thus, the interior annulus 12 is separated into two opposite magnetic poles 123 (N pole and S pole). A metal plate 124a and a metal plate 124b are filled each in the opening 122, respectively, to reduce the magnetic leakage. In addition, there is a trench 127 which further separates the magnetic pole 123 into two sectors. A metal ring 125 is disposed in the trench 127 (Typically called shaded coil). The metal ring 125 is often a single strip copper wire, or sometimes more than one lap. Insulating plates 126a, 126b are disposed over and under the stator 10. A coil 20 is wound along the neck portion 121 between the exterior annulus 11 and the interior annulus 12. The coil 20 is wrapped by an insulating plate 126a, 126b. While a current is flowing through the coil 20, a magnetic flux is induced at the magnetic pole 123. With the disposition of the metal ring 125 in the magnetic pole 123, after the magnetic flux is induced in the magnetic pole 123, the magnetic flux of the magnetic pole 123 (the smaller one) is affected by the induced current in the metal ring 125. Thus, the rotor (not shown) installed at center of the interior annulus 12 can be rotated.

Being restricted by the structure of the stator 10, to install the coil 20 into the stator 10 is complicated. The coil 20 has to be wound and formed in advance (Currently, an automatic winding machine has replaced the conventional manual winding process). The coil 20 is wound and formed by tape to prevent from being loosened. The coil 20 is then inserted through the openings 122 which have been encased by the insulating plate 126a, 126b and fixed on the neck portion 121. The openings 122 are sealed by the metal plates 124a, 124b to complete the assembly of the stator 10.

However, the are stator of a motor has at least the following disadvantages:

(1) The assembly procedure is so complicated that the coil 20 has to be formed before being inserted into the magnetic pole 123 of the stator, and fixed on the neck portion 121. A part of the assembly procedure is carried out manually, so that the cost is high.

(2) The coil 20 is encased in the conventional stator. The openings 122 of the magnetic pole 123 have to be wider than the width of the coil 20. The coil 20 is often formed with a widened diameter to ensure the safety of manufacturing. This structure thus causes the coil 20 encased on the neck portion 121 to be loosened. A lot of coil material is consumed, so that the fabrication cost is raised. The large consumption of the coil material also increases a lot of energy consumption to decrease the efficiency of the motor.

(3) As mentioned in (2), a certain thickness is required for the coil 20. When the gap of the openings 122 is excessively large, a serious magnetic leakage of the stator is caused thereby. The magnetic field of the magnetic poles in the stator is reduced to cause a smaller output torque. Even with the metal plate 123 being filled into the openings 122 to reduce the magnetic leakage, the consequent effect is also limited (The increase on the cost of work process is additionally bound to raise the aggregate cost of the motor)

SUMMARY OF THE INVENTION

It is an object of the invention to provide a stator of a rotor. A conductive wire is wound directly on a magnetic pole without the complicated conventional assembling procedure. The consumption of coil material is curtailed, the gap between magnetic poles can be further shrunk to a preferable level to reduce the magnetic leakage, and the efficiency of the motor is enhanced.

To achieve the above-mentioned objects and advantages, a stator of a motor is provided. A stator base is provided. The stator base includes two separate laminations with shapes symmetrical to each other. These two laminations are disposed in two corresponding positions. Each lamination includes corresponding engagement portions. The stator base is assembled by engaging these two laminations according to the relationships between the engagement portions. From the above structure, a coil can be wound directly on these two laminations. The coil is then formed by an automatic winding procedure. These two laminations wounded with coils are assembled. During the winding procedure, the coils can be attached tightly within the stator. Thus, the consumption of the coil material is cut down, and the energy lost is reduced. Since the gap between two laminations are adjusted to minimize the gap in between, so that the object of reducing magnetic leakage is achieved. Summarizing the above structure of the stator, the invention provides a stator of a motor with a simplified manufacturing process, a reduced material consumption, and a reduced number of components. Moreover, the cost is lowered and efficiency of a motor is enhanced.

Both the foregoing general description and the following detailed description are exemplary and explanatory only and are not restrictive of the invention, as claimed.

DESCRIPTION OF THE PREFERRED EMBODIMENTS

Figure 1:
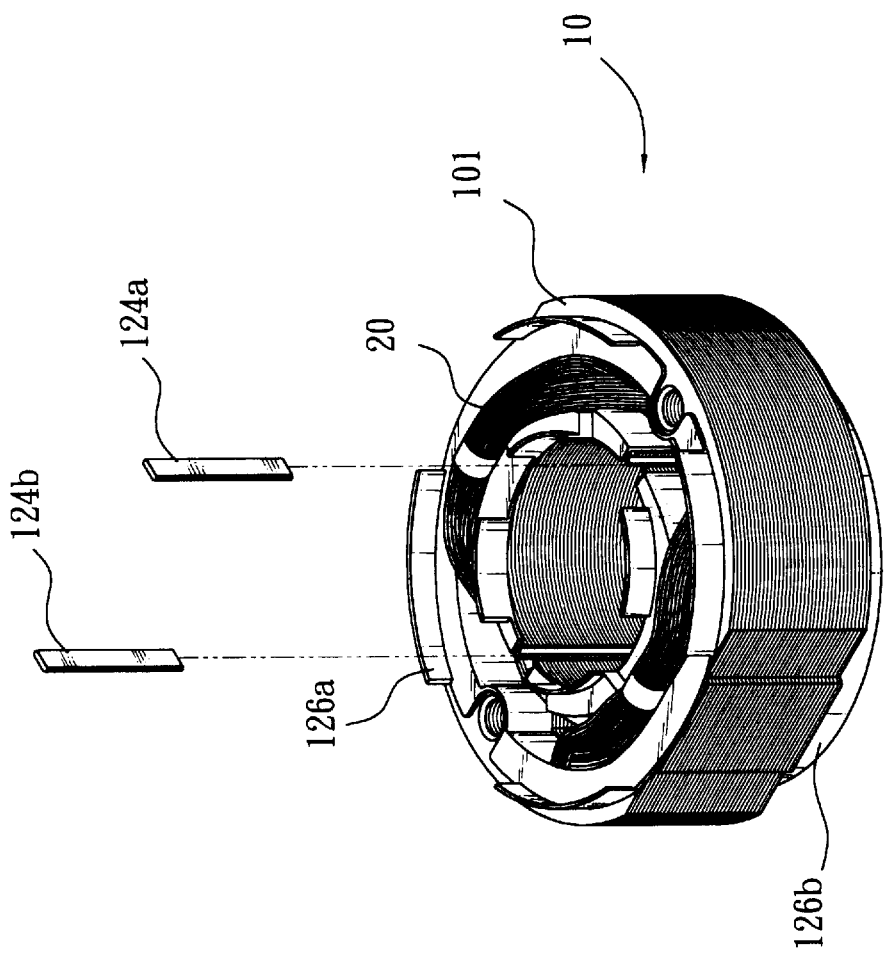
FIG. 1 shows a schematic view of a conventional stator of a motor.
Figure 3:
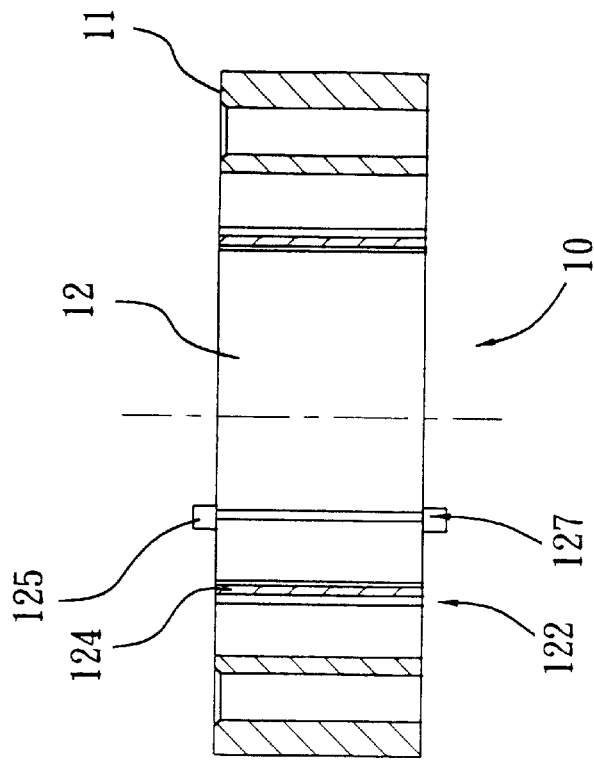
FIG. 3 is cross sectional view taken along a cutting line I—I of FIG. 2.
Figure 2:
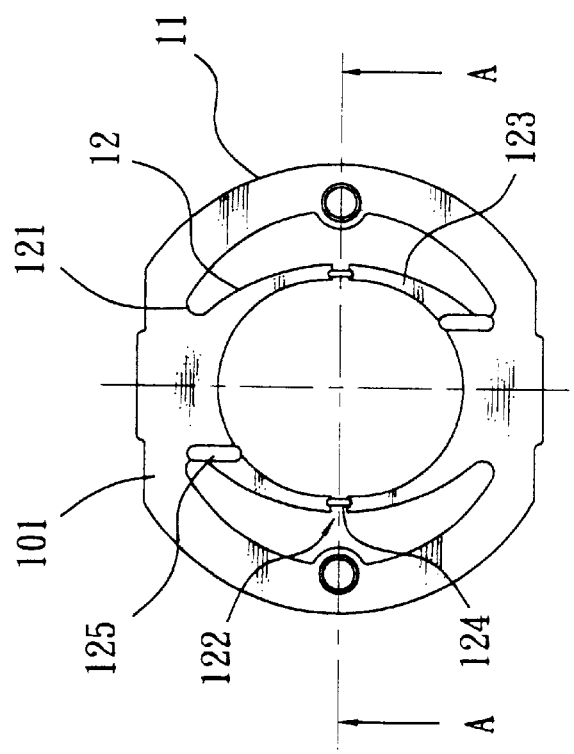
FIG. 2 shows a side view of a conventional stator of a motor.
Figure 4:
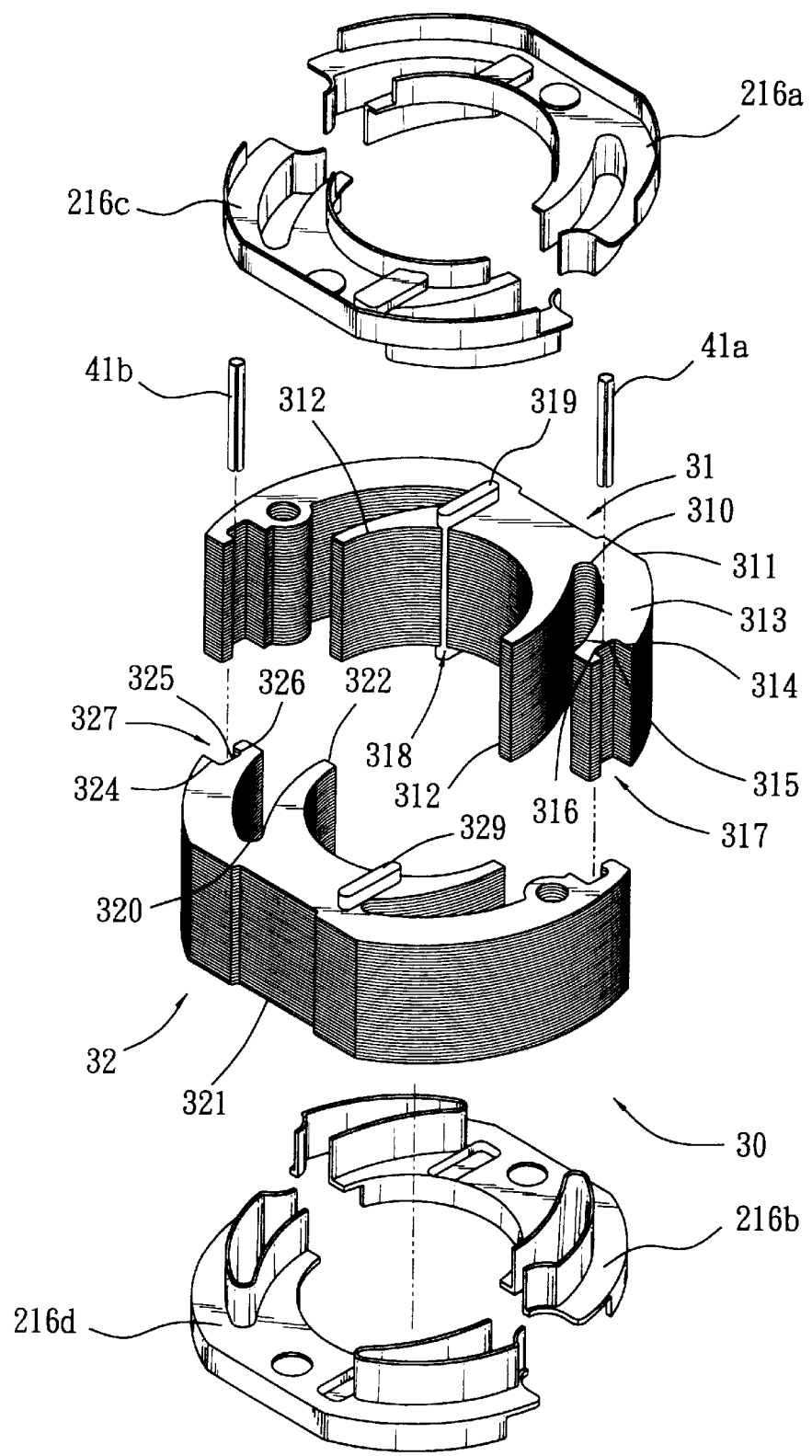
FIG. 4 is an exploded view showing a stator of a motor in an embodiment according to the invention.
Figure 9:
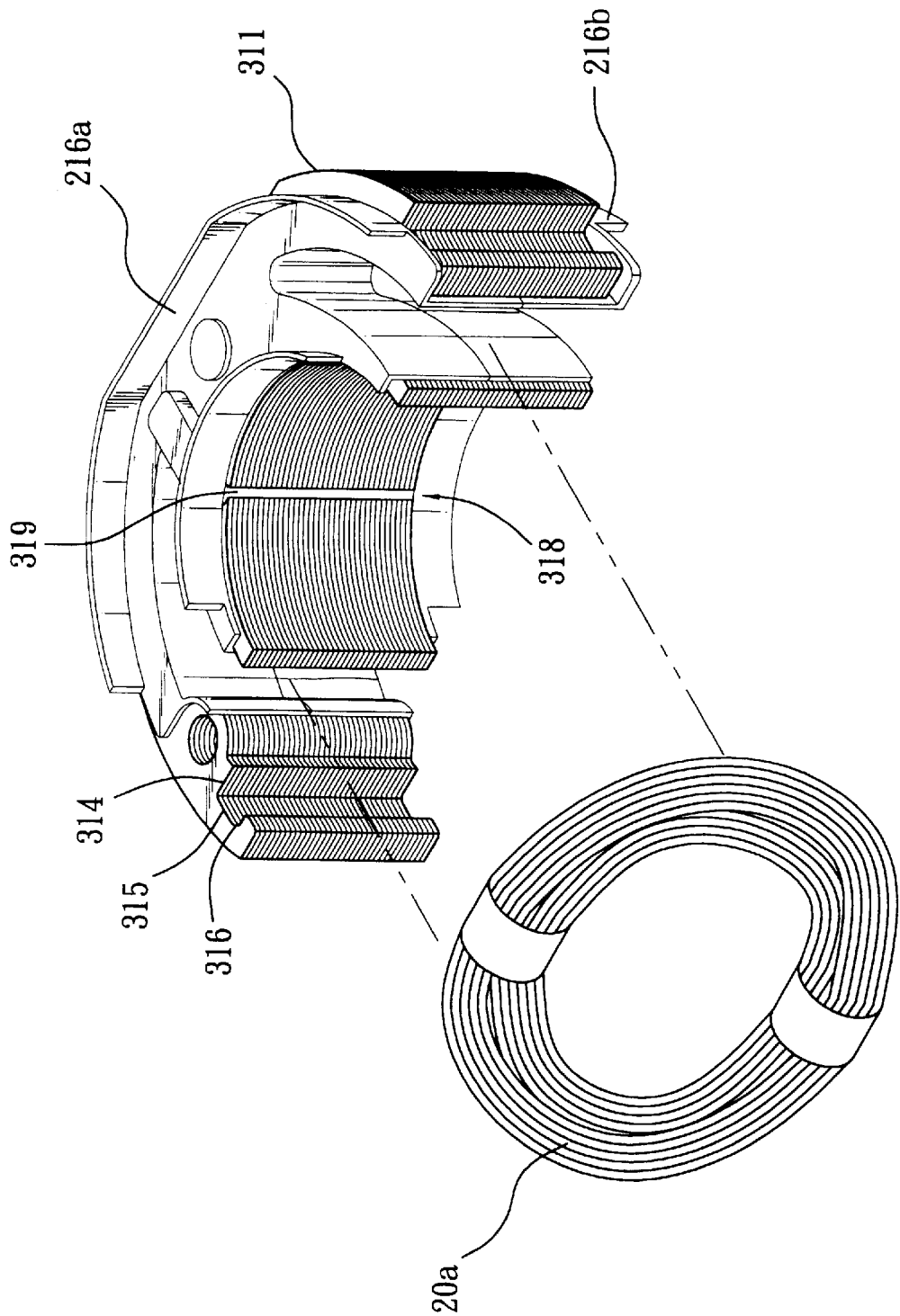
FIG. 9 is schematic view of a coil wound on a magnetic pole structure according to the invention.

In FIG. 4, an exploded view of a stator in a motor in an embodiment according to the invention is shown. The stator base 30 includes a first lamination 31 and a second lamination 32. The first lamination 31 further includes a first magnetic pole base 311 and a first magnetic pole 312. The first magnetic pole base 311 and the first magnetic pole 312 are connected by a first neck portion 310. Conductive wires are wound on the first neck portion 310 after disposing an upper insulating plate 216a and a lower insulating plate 216b to form a coil 20 (as shown in FIG. 9). A trench 318 is opened in the first magnetic pole 312 to separate the first magnetic pole 312 into two sections. A metal ring 319 is installed in the trench 318 (typically called as a shaded-pole coil). The metal ring 319 includes a single strip of copper wire, or a single lap of copper coil. By the installation of the metal ring 319, a current flowing through the coil 20a induces a magnetic flux of the first magnetic pole 312. The current induced in the metal ring 319 further induces a magnetic flux on the first magnetic pole 312 (the smaller section) to advantage the rotation of a rotor (not shown) installed in the stator 30.

Figure 5:
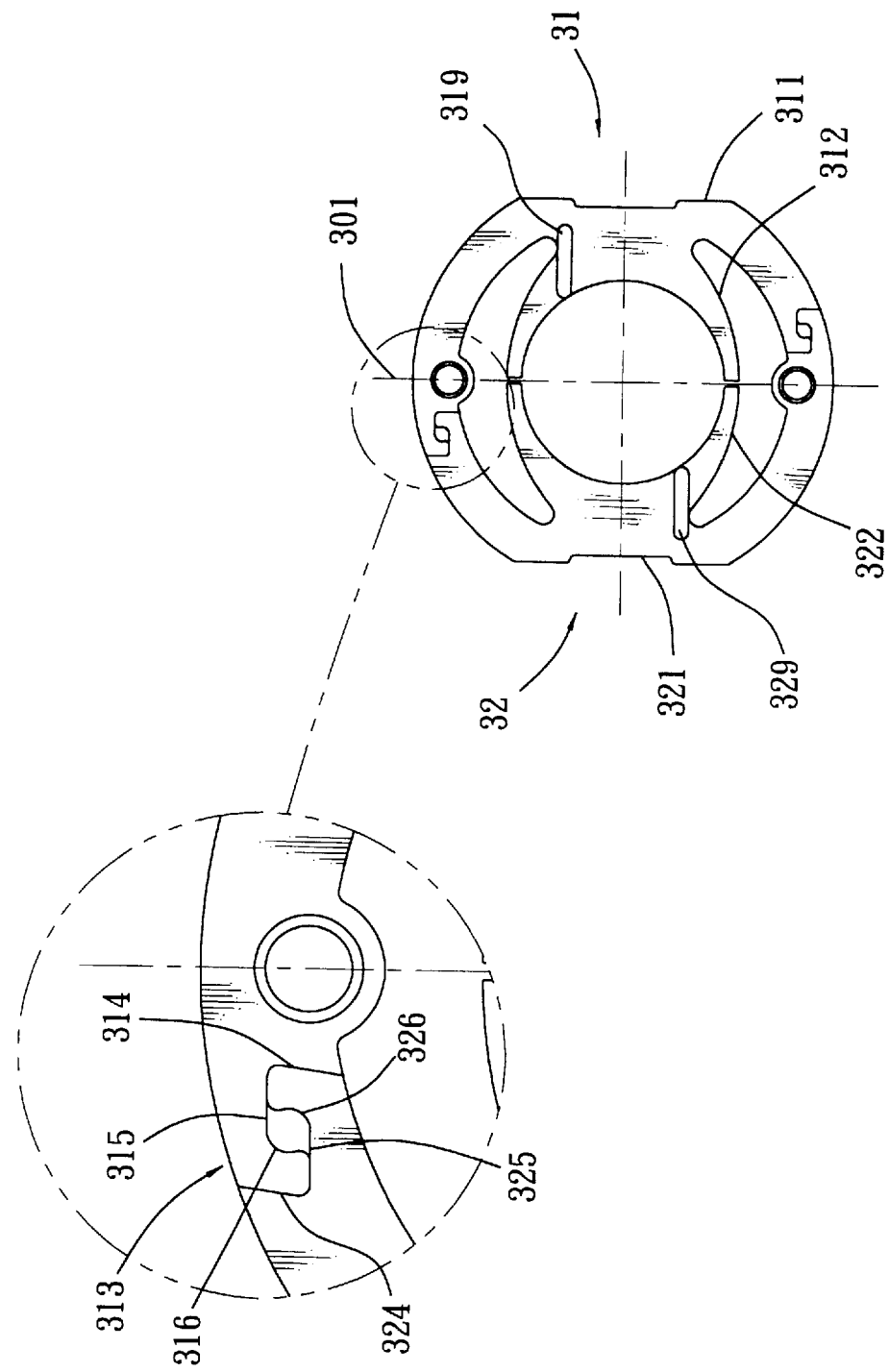
FIGS. 5A and 5B show a top view of the stator shown in FIG. 4.

The first magnetic pole base 311 has two ends each includes a first engagement portion 313. Referring to FIG. 5, each engagement portion 313 includes a hollowed opening 317 which is formed by a tilt side wall 314, a bottom wall 315, and a camber wall 316. A line extending from the tilt side wall 314 intersects with a central line 301 of the stator base 30. The bottom wall 315 is perpendicular to the central line 301 and connected to the tilt side wall 314. The camber wall 316 is opposite to the tilt side wall 314 and connected to the bottom wall 315. The tilt side wall 314, the bottom wall 315, and the camber wall 316 thus form the opening 317 of the first engagement portion 313. Each opening 317 at each end of the first engagement portion 313 of the magnetic pole base 311 face the same direction.

In contrast, the second lamination 32 to be connected with the first lamination 31 has a similar and symmetric structure to the first lamination 32. The second lamination 32 includes a second magnetic pole base 321 and a second magnetic pole 322. The second magnetic pole 322 has magnetism opposite to the magnetism of the first magnetic pole 312. The second magnetic pole 322 is connected to the second magnetic pole base 321 by a second neck portion 320. Wires are wound on the neck portion 320 to form a coil 20a after encasing an upper insulating plate 216c and a lower insulating plate 216d. A trench 328 is also opened in the second magnetic pole 322 to separate the second magnetic pole 3 into two sections. A metal ring 329 made of same material as the metal ring 328 is filled in the trench 328. The second magnetic pole base 321 has two ends each comprising an engagement portion 323 to connecting the engagement portion 313 of the first magnetic pole base 311. Each engagement portion 323 includes a hollowed opening 327 which is also formed by a tilt side wall 324, a bottom wall 325, and a camber wall 326 (as shown in FIG. 5). The bottom wall 325 is perpendicular to the central line 301 and connected to both the tilt side wall 324 and the camber wall 326, while the camber wall 326 is opposite to the tilt side wall 324. A line extending from the tilt side wall 324 intersects the central line 301 of the stator 30. The opening 327 of the second engagement portion 323 is thus formed by the tilt side wall 324, the bottom wall 325, and the camber wall 326. Each opening 327 at each end of the first engagement portion 323 of the second lamination 32 faces a same direction, so as to engage the first engagement portion 313 of the first magnetic pole base 311.

Figure 10:
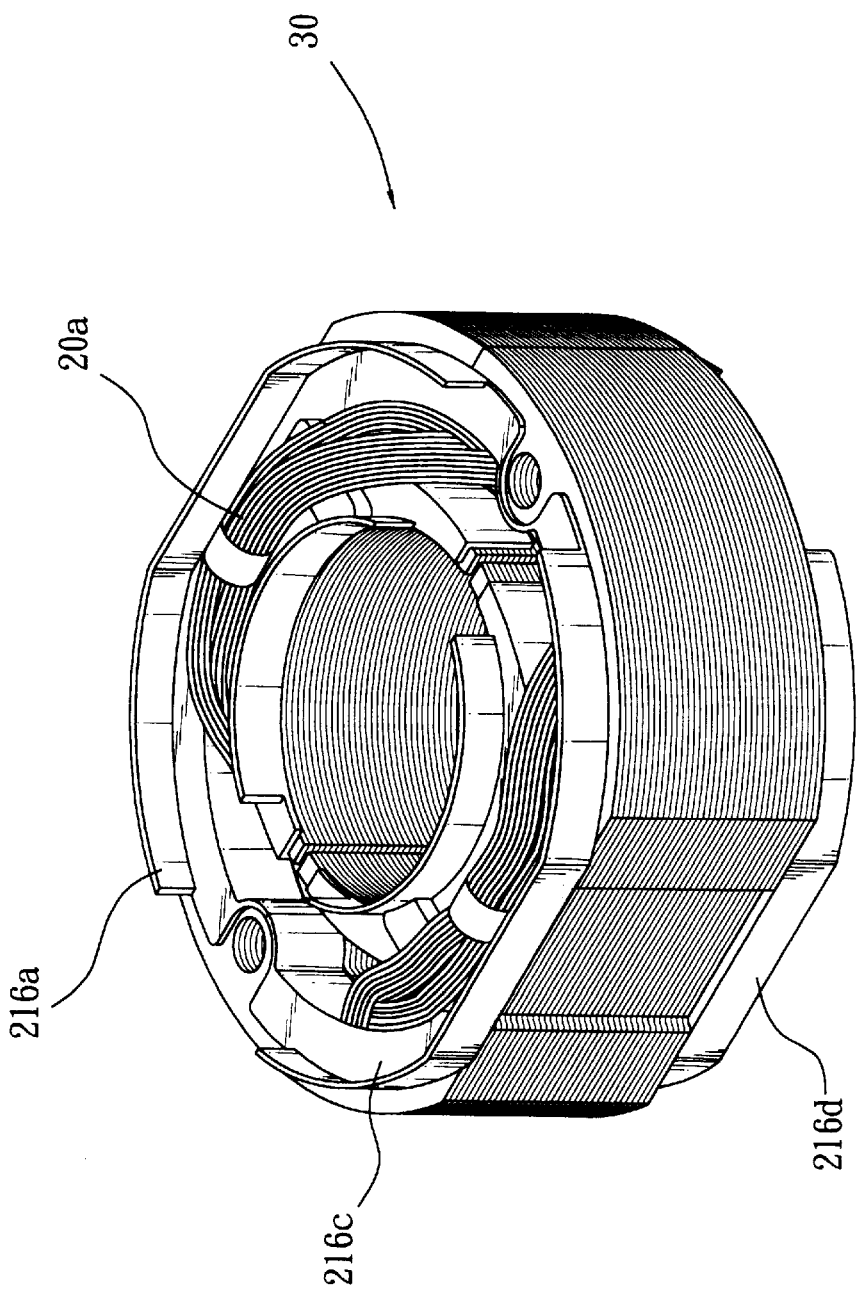
FIG. 10 shows an assembly of the above elements.

After combining the first lamination 31 and the second lamination 32, a hole 40 is formed (by two camber walls 316 and 326) at the engagement portion of the first and the second engagement portions 313 and 323. A fixing element 41a, 41b (as shown in FIG. 4 and FIG. 5) with a diameter larger than the diameter of the hole is disposed at each hole 40. By the flexibility of the fixing elements 40, the first engagement portion 313, the first engagement portion 313 is matched on the tilt side wall 324 of the second engagement portion 323, and the second engagement portion 323 is matched on the tilt side wall 314 of the first engagement portion 323. The first lamination 31 and the second lamination 32 are thus dovetailed with each other. The fixing elements include a cylindrical spring tube with a groove 411. Thus, a deformation along a radial direction is caused since the fixing elements 41a, 41b has a larger diameter larger than the diameter of the hole 40. An outward tension is thus induced by the deformation of the fixing elements 41a, 41b. The first lamination 31 and the second lamination 32 are assembled as the structure shown in FIG. 10 by the dovetailed structure of the first engagement portion 312 and the second engagement portion 322.

Figure 8:
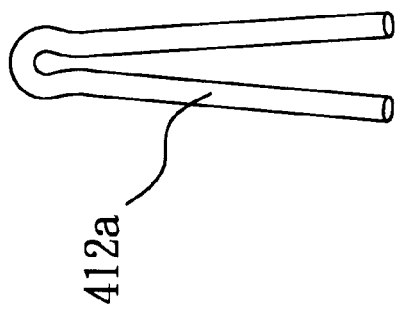
FIG. 8 is a schematic view of a fixing element in a third embodiment.
Figure 7:
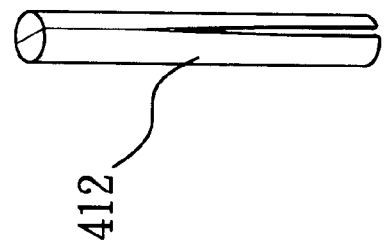
FIG. 7 is a schematic view of a fixing element in a second embodiment.
Figure 6:
FIG. 6 is a schematic view of a fixing element in a first embodiment.

In addition, the fixing elements 41a, 41b may also employ the type as shown in FIG. 7. As shown in the figure, the fixing elements 41a, 41b include two sheets of spring 412 connected with a V-shape at one end. Alternatively, the fixing elements 41a, 41b can be formed by bending a spring sheet 412a into a V-shape (Shown as FIG. 8). The fixing elements 41a and 41b in the shape as FIG. 7 and FIG. 8 have a same performance as the above embodiment.

Figure 12:
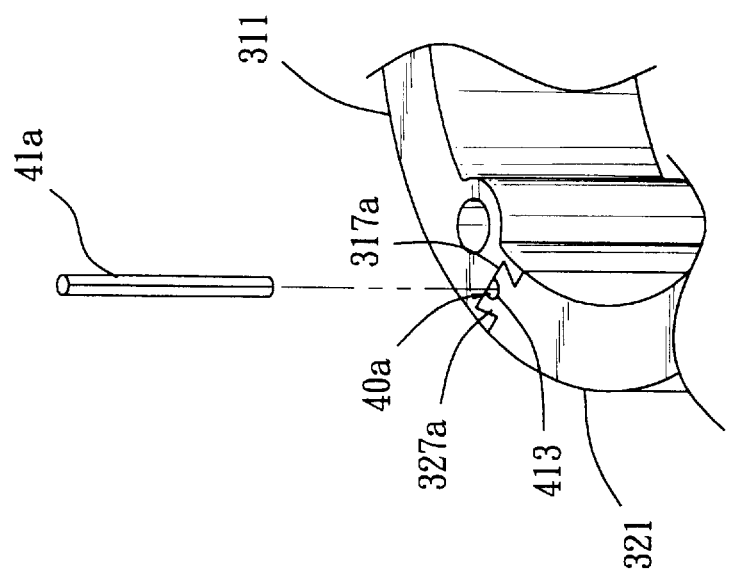
FIG. 12 shows an engagement portion in a third embodiment.
Figure 11:
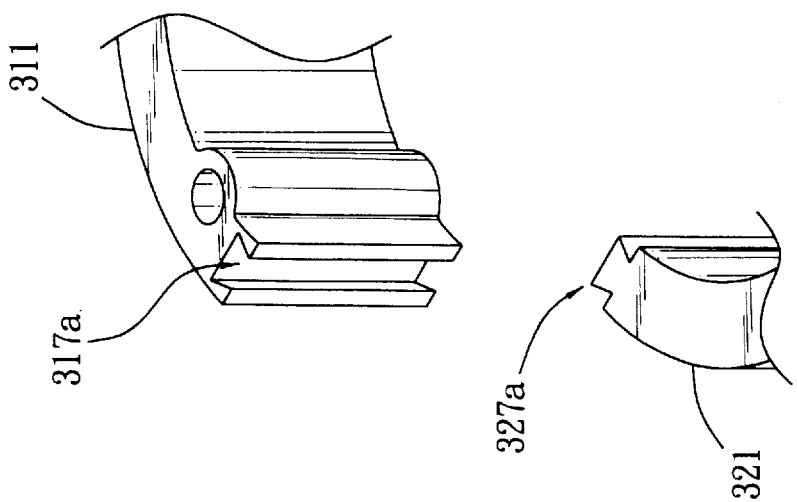
FIG. 11 shows an engagement portion in a second embodiment.

Referring to FIG. 11, the first engagement portion 313 may include a dovetailed trench 317a instead of the trench 317 described above. Similarly, the second trench may also be replaced by a dovetailed trench 327a. By dovetailing the first and the second dovetailed trenches 317a and 327a, the first lamination 31 and the second lamination 32 are assembled as the stator base 30. At the joggling surface of the dovetailed trenches 317a and the dovetail 317b, a trench 329 may be formed (shown as FIG. 12) to form a hole 40a after joining the dovetailed trench 317a and the dovetail 327a. The fixing element 41 is then inserted into the hole 40 to strengthen the assembly by the tension of the fixing element 41*a*. The first lamination 31 and the lamination 32 are thus combined more stably without being loosened.

Figure 13:
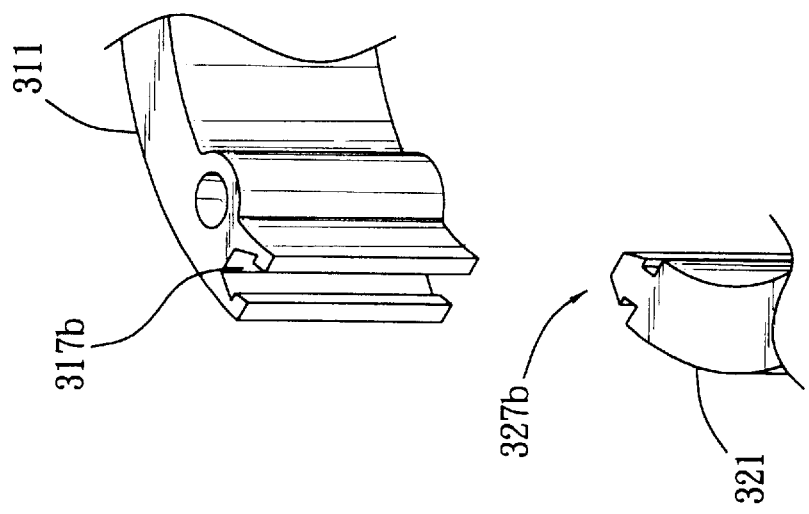
FIG. 13 shows an engagement portion of a fourth embodiment.

Referring to FIG. 13, another example of an engagement portion is shown. The first opening 317 is replaced by an embedding trench 317*b*, while the second opening 327 is replaced by an embedding hook 327*b*. By joggling the embedding hook 327*b* and the embedding trench 317*b*, the first lamination 31 and the second lamination 32 are closed and stably combined.

The invention includes advantages such as:

1) The conductive wires are directly and tightly wound on the stator with a less amount of material consumption.
2) The assembly procedure is simplified, so that the manufacturing cost is lowered.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A stator of a motor, comprising:
   a first magnetic pole base, comprising a first continuous magnetic pole connecting to the first pole base via a first continuous neck portion, and a coil wound on the first neck portion;
   a second magnetic pole base, comprising a second continuous magnetic pole connecting to the second pole base via a second continuous neck portion, and a coil wound on the second neck portion;
   an assembly means, to combine the first magnetic pole base and the second magnetic base and form a stator for use in a motor, wherein the assembly means does not involve either the magnetic poles or the neck portions, so as to allow the coils to be wound on the first and second neck portions, respectively, before the first and second magnetic pole bases are combined.

2. The stator according to claim 1, wherein the assembly means comprising:
   a first engagement portion, formed in the first magnetic pole base; and
   a second engagement portion, formed in the second magnetic pole base, the first engagement portion and the second engagement portion being able to engage each other together.

3. The stator according to claim 2, wherein the first engagement portion comprises a dovetailed trench, and the second engagement portion comprises a dovetail.

4. The stator according to claim 2, wherein the first engagement portion comprises an embedding trench, and the second engagement portion comprises an embedding hook which can be joggled with the embedding trench.

5. The stator according to claim 2, wherein the first engagement portion and the second engagement portion have a joggling surface comprising a hole, and a fixing element is installed in the hole to fasten the first engagement portion and the second engagement portion without being loosened.

6. The stator according to claim 5, wherein the hole is disposed in a camber wall of each of the first and the second engagement portions.

7. The stator according to claim 5, wherein the fixing element comprises a spring tube.

8. A stator of a motor, comprising:
   a first magnetic pole base, comprising a first magnetic pole connecting to the first magnetic pole base via a neck portion, two ends each having a first engagement portion, and a coil wound on the first neck portion;
   a second magnetic pole base, comprising a second magnetic pole connecting to the second magnetic pole base via a neck portion, two ends each having a second engagement portion, and a coil wound on the second neck portion;
   a hole, at a joggling surface of the first engagement portion and the second engagement portion; and
   a fixing element, installed in the hole to joggle the first engagement portion and the second engagement portion.

9. The stator according to claim 8, wherein the first engagement portion comprises a dovetailed trench, and the second engagement portion comprises a dovetail.

10. The stator according to claim 9, wherein the dovetailed further comprises a trench to form the hole after joining the dovetailed trench.

11. The stator according to claim 8, wherein the first engagement portion comprises an embedding trench, and the second engagement portion comprises an embedding hook.

* * * * *